Nov. 27, 1956   M. A. SCHAFFER ET AL   2,771,779
QUICK SETTING MEANS FOR GYRO STABILIZED MECHANISMS
Filed Feb. 8, 1955   2 Sheets-Sheet 1
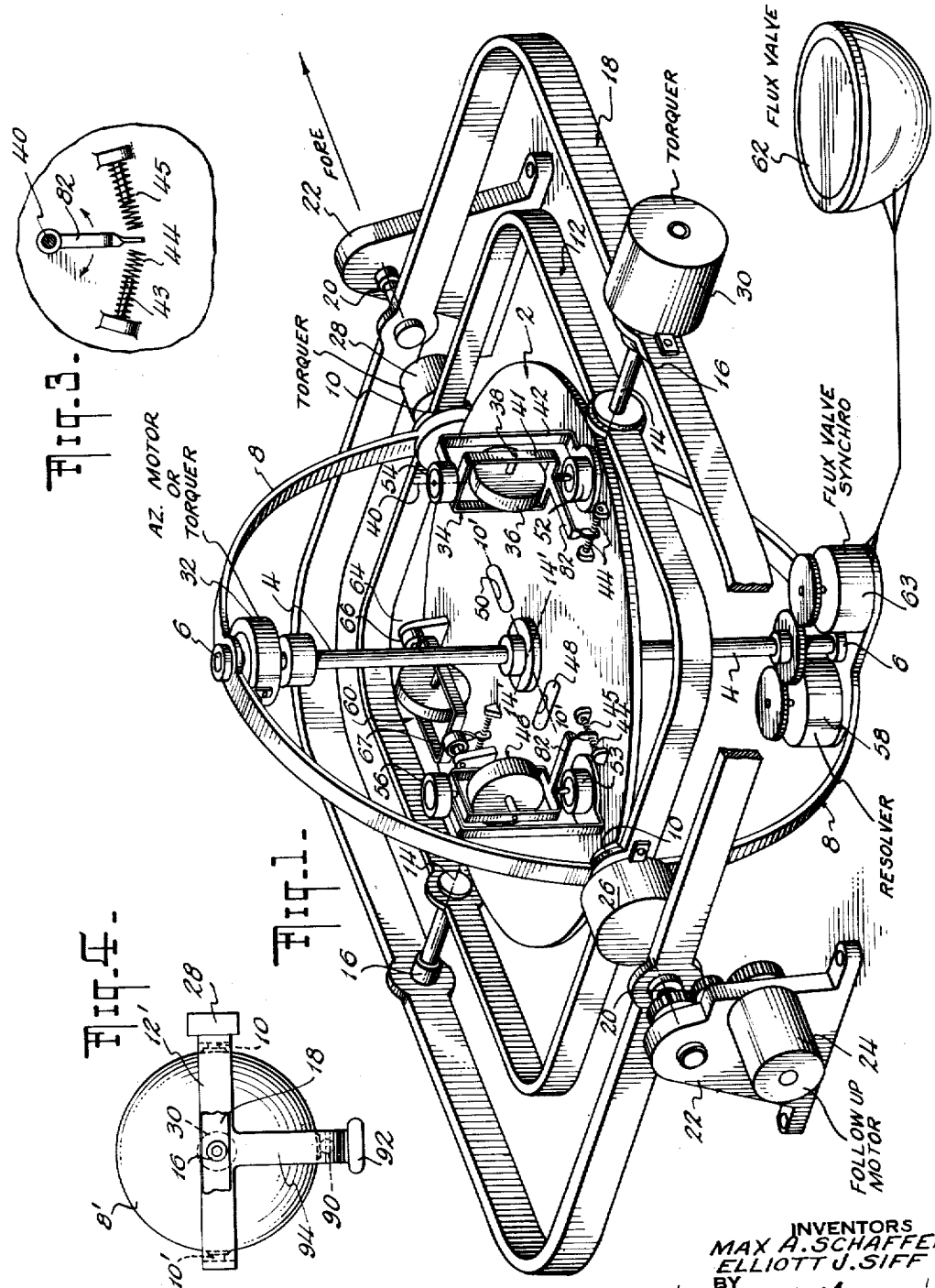
INVENTORS
MAX A. SCHAFFER
ELLIOTT J. SIFF
BY
Herbert H. Thompson
ATTORNEY

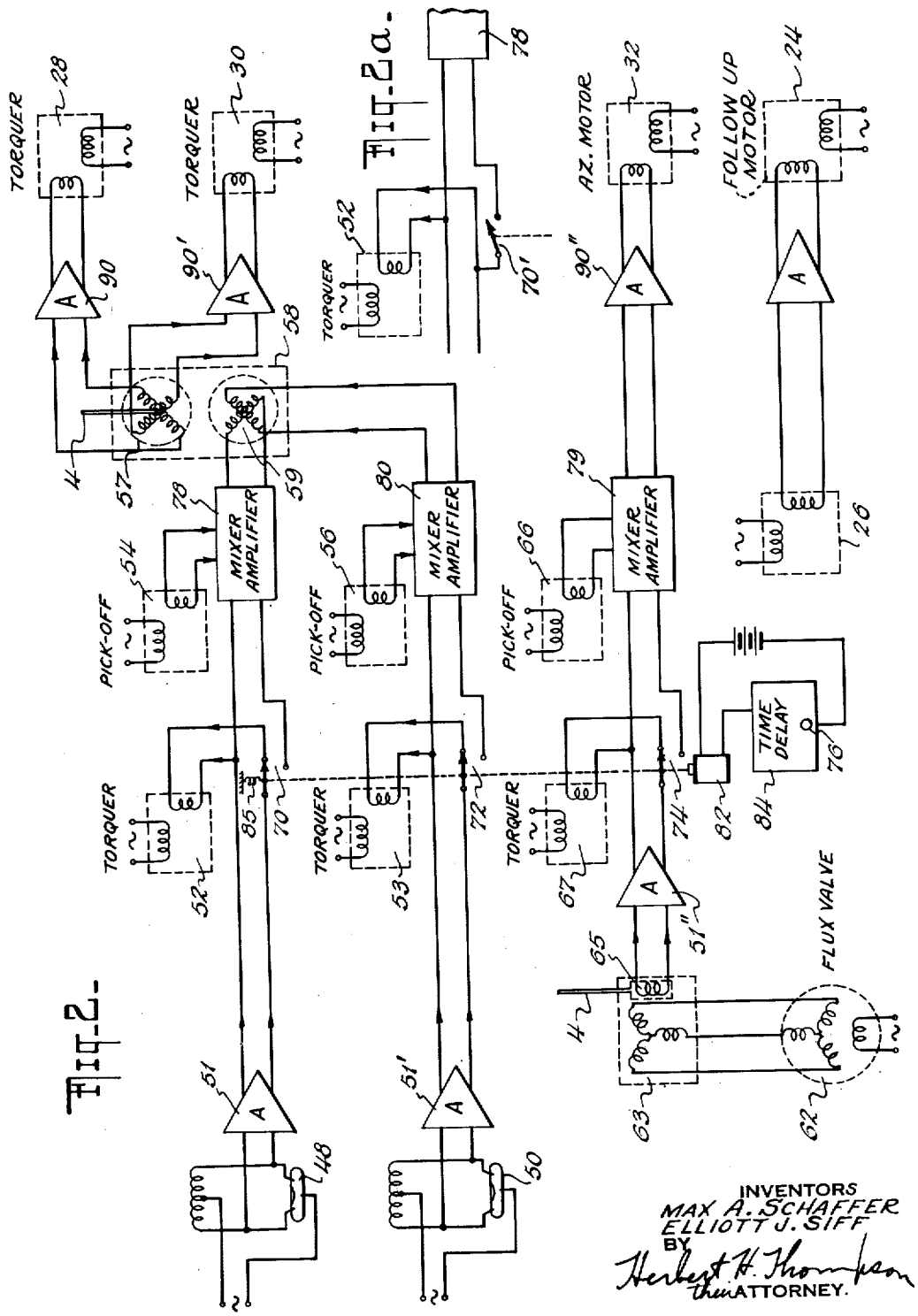

United States Patent Office 2,771,779
Patented Nov. 27, 1956

2,771,779

QUICK SETTING MEANS FOR GYRO STABILIZED MECHANISMS

Max A. Schaffer, Williston Park, and Elliott J. Siff, Whitestone, N. Y. assignors to Sperry Rand Corporation, a corporation of Delaware Application February 8, 1955, Serial No. 486,768

16 Claims. (Cl. 74—5.34)

From a broad standpoint, our invention relates to a slaved type gyroscopic system in which the position of the system is slowly corrected during normal operation from a reference device, such as a gravitational device or compass, and wherein it is desirable to preset the system in starting up so that its position approximately agrees with the reference device to avoid the long time delay in settling that would be incurred in case the system was started up far from its synchronized position. Our invention is, therefore, applicable both to the Gyrosyn or slaved directional gyroscopes which are coupled to some form of magnetic compass and to so-called gyro vertical or artificial horizon gyroscopes which are slaved to some form of gravitational device such as a pendulum or liquid level, and to a combination of such instruments in the form of a platform stabilized in azimuth as well as horizontally.

More specifically, this invention relates to means for quickly erecting and bringing on to the meridian a gyroscopically stabilized platform which is not only maintained in a horizontal plane but is maintained fixed in azimuth from some form of compass. The type of stable platform to which my invention is most closely related is shown in the prior patent to Robert F. Hays, Jr., No. 2,591,697, dated April 8, 1952, for Stable Reference Apparatus. Such an apparatus is maintained horizontal about two axes by a pair of gyroscopes mounted thereon, one of which stabilizes it about one axis and the other about an axis normal thereto. Each gyroscope has freedom about a vertical axis and each has a horizontal spin axis normal to the other. A third degree of freedom for each gyro is provided by one of the main gimbal axes of the platform which is normal to the spin axis of that gyro. To one of the gyros is applied a torque about its vertical axis upon tilt of the platform with respect to a gravitational reference about one of said gimbal axes to cause the gyro to precess slowly and carry the platform with it in a direction to oppose such tilt, while to the other similar gyroscope is applied a torque about its vertical axis upon tilt of the platform about the other of said horizontal axes with respect to a gravitational reference causing the latter to slowly precess and carry the platform with it in a direction opposite to this tilt. At the same time, any precession of each gyro about its vertical axis brings into action a torque motor acting about one or the other of said horizontal axes. Thus, the platform is maintained level, and the deviating effects of gimbal friction overcome.

At the same time, the platform is rotatably mounted in azimuth about a normally vertical axis and is maintained fixed with respect to the meridian by signals responsive to deviation thereof from a compass reference which causes a torque to be applied to a third gyro causing precession thereof about its vertical axis in a direction to oppose deviation to thereby orient the platform. At the same time, any precession of the gyro about its horizontal axis brings into action an azimuth motor acting about the vertical axis of the platform.

In the past, it has been proposed to initially erect such a platform and bring it on the meridian by mechanical caging and resetting devices, or through the aforesaid torquers, the output of which was temporarily increased to increase the precession rate somewhat. Such devices have not been found satisfactory, however, since they are either quite slow or involve mechanical caging and require resetting mechanisms in addition to that normally used for erection or meridian seeking during normal operation.

By our invention, on the other hand, very fast erection and synchronization is obtained with very little mechanism added to the system, and to accomplish this, we employ the same servomotors or torquers and pick-offs employed during normal operation, but change the connections in such a manner as to accomplish very quick damped erection and synchronization.

Referring to the drawings illustrating one form our invention may assume,

Fig. 1 is a plan perspective view in somewhat diagrammatic form showing a gyroscopically stable platform or system to which our invention has been applied;

Fig. 2 is a simplified wiring diagram showing the normal connections and the special connections employed during our quick erecting and setting cycle;

Fig. 2A is a detailed wiring diagram showing slightly different connections for causing the gravitational devices to control the main follow-up motors or torquers during quick levelling;

Fig. 3 is a detailed showing of the preferred construction of fixed stops and centralizing springs for each gyroscope; and Fig. 4 is a simplified view on a smaller scale of a stabilized platform showing a modified form of damper which may be used in conjunction with our quick erection device.

In the drawings, the stabilized platform is shown as a base 2 rotatably mounted about a normally vertical axis by means of a vertical shaft 4 journalled at top and bottom in bearings 6 in the vertical ring 8 which may be made in the form of or have attached thereto an enclosed casing 8' (Fig. 4) for the platform and the apparatus mounted thereon. The ring 8 in turn is journalled for freedom about the fore-and-aft axis 10—10 in normally horizontal gimbal ring 12 which in turn is journalled for freedom about a second normally horizontal axis 14—14 in bearings 16—16. The platform, therefore, has three full degrees of freedom, but I prefer to provide an extra gimbal ring 18 in which bearings 16—16 are mounted, the gimbal 18 being journalled for freedom about horizontal axis 20—20 in the main support dom 22. Preferably the axis 20 is placed fore-and-aft on the ship or airplane and is normally in line with the axis 10—10 thus providing an extra gimbal support for the purpose of avoiding or preventing the gimbals from getting into a gimbal lock position, as described and claimed in the prior patent to Robert Haskins, Jr., No. 2,584,876, dated February 5, 1952. Servomotors or torquers are provided about each of the aforementioned horizontal axes. Thus, the outer gimbal 18 is stabilized about its axis 20—20 by servomotor 24 which is controlled by some form of pickoff 26 mounted on ring 12 and responsive to relative tilt of the gimbal rings 12 and 18 is thus maintained horizontal about axis 20 as is gimbal 12 about axis 10. Also a torquer 28 acts between ring 8 and gimbal 12 and a second torquer 30 acts between the gimbal 12 and the ring 18. An azimuth motor or torquer 32 acts between gimbal 8 and the vertical shaft 4 of the platform.

Said torquers 28, 30 and 32 are each normally controlled respectively from the precession of one of the three gyroscopes mounted on the platform. The gyroscope 34 has its rotor 36 mounted in vertical ring 41 for spinning about horizontal axis 38 normally in line with or parallel to axis 16—16. Said ring 41 mounts said gyroscope for freedom or precession about a vertical axis 40 within its supporting frame 42, said freedom being limited by stops 43 in the path of arm 82 secured to the vertical ring 41. The gyroscope 46 is mounted in similar fashion in a vertical ring 34' for freedom and precession about a vertical axis and with its spin axis normal to that of rotor 36, i. e., normally parallel to axis 10—10. Like limit stops are provided as shown at 82', 43.

As gravitational references for controlling the precession of each gyroscope, I show a liquid level device 48 for gyro 34 and 50 for gyro 46. The former is responsive to tilt of the platform about the horizontal axis 10'—10' perpendicular to level 48 which is shown as in line with axis 10—10, and the latter is responsive to tilt about the horizontal axis 14'—14' perpendicular to level 50 which is shown as in line with gimbal axis 14—14. Thus, if the platform tilts about axis 10'—10' with the platform oriented in azimuth as shown in Fig. 1, the output of the liquid level 48 will be altered to cause unbalance in the resistance of two halves of the liquid level and hence vary the current supplied through amplifier 51 to one of the two windings of the torquer 52, as indicated in Fig. 2, thus applying a torque about the vertical axis 40 of the gyro. This will cause the gyroscope to precess and tilt with it the platform about the axis 10—10 in a direction opposite to the original tilt, thereby maintaining the ring 8 erect and the platform 2 level.

Due to friction in the gimbal bearings, the inertia of the platform about its gimbal axis and other causes, some precession of the gyro about its vertical axis in the direction of the applied torque will occur and this is utilized to overcome these error causing effects by providing a pick-off 54 on gyro 34 and a pick-off 56 on gyro 46 responsive to such precession. Said pick-offs are shown of the vario-transformer type. The signals from the same control through amplifiers 78 and 80 torquers 28 and 30 acting about the respective gimbal axes 10—10 and 14—14 which assist the torques from the gyros in keeping the platform level. Since, however, the platform is rotatable in azimuth with respect to the gimbal axis 20 fixed on the aircraft or ship, it is necessary to provide a resolver 58 between the amplifiers and the torque motors, one part 57 of which is mounted (Fig. 2) for turning about the vertical axis 4 with the platform and the other part 59 fixed to ring 8. This resolver may be in the form shown in Fig. 2 of the aforesaid Hays patent and resolves the signals from the respective pick-offs into components about the fixed fore-and-aft and transverse axes of the gimbals.

The construction and action of the gyroscope 60 which acts about the vertical axis or in azimuth is similar to that of the other two gyros, except that its precession axis 64 is horizontal instead of vertical and it is primarily controlled from a compass device or reference 62 instead of from a liquid level or other gravitational reference. The compass device 62 may be in the form of a flux valve, the output of which is matched against a synchro transformer or selsyn signal generator 63 geared to the vertical shaft 4 of the platform so that when the platform deviates from its proper position in azimuth with reference to the earth's field as detected by the flux valve, a signal is generated in winding 65 which, after amplification in amplifier 51'', applies a torque about the horizontal axis 64 of the gyro 60, through torquer 67. This causes the gyroscope to precess in azimuth carrying with it the platform, and any resistance to such motion will result in precession of the gyroscope about axis 64, thus displacing pick-off 66. Thus, a signal is generated by the pick-off 66 which is applied to the azimuth motor 32 to assist the gyro in orienting the platform. Most of the apparatus so far described constitutes a known stable reference to which our invention is particularly adapted to be applied as a quick levelling and meridian setting arrangement. However, the yielding stops 82, 43, 44 and 45 are a part of our improvements.

According to our improved quick starting system, we provide an auxiliary control arrangement which will level the platform and bring it on the meridian in a fraction of the time required to do so by normal operation, since, in normal operation, the movements of the system are quite slow because of the long period necessary to prevent the system from being disturbed by acceleration forces of short duration or by short period errors in the magnetic compass. Therefore, a long synchronizing period is necessary for a properly operated stable platform, usually on the order of 30 to 90 minutes. In starting up, however, vital time may be lost in waiting for the system to settle and, therefore, we provide our quick setting means. For this purpose, we provide setting switches 70, 72 and 74 preferably operated from a single starting button switch 76 which causes the normal signals from the liquid levels to their gyro torquers to be applied to the roll and pitch gimbal torquers 28 and 30 after being greatly amplified in strength by connecting the liquid level devices first to amplifiers 90 and 90' and then to the roll and pitch torquers (through, of course, the resolver 58). Thus, it will be seen in Fig. 2 that in the position of the aforesaid switches 70 and 72 shown, the liquid level devices 48 and 50 control the excitation of control windings of the respective torquers 52 and 53, while the pick-off devices 54 and 56 together control the roll and pitch torquers 28 and 30 through resolver 58. However, when the switches are moved to their lower position, the liquid level devices are disconnected from the respective torquers 28 and 30 and their outputs transferred to their respective mixer amplifiers 78 and 80 connected to the resolver 58 and thence to the proper amplifiers 90, 90' and to the roll torquer and pitch torquer. Thus, at this time the roll torquer and pitch torquer are directly operated from the liquid level devices and the platform is quickly levelled about both axes.

Since the torque exerted by the torquers 52 and 53 is quite small to give the gyros a long period, the signal from the liquid levels 48 and 50 need not be severed from these torquers during quick erection, in which case the switches 70, 72 and 74 may assume the form shown at 70' in Fig. 2A, by which the connections between amplifiers 51 and 51' to the torquers 52 and 53 remain undisturbed, but the signal from said amplifiers is also temporarily applied during quick erection to the mixer amplifiers 78 and 80, after which, of course, it is greatly amplified in amplifiers 90 and 91, the amplification being on the order of 1000:1. Because of this large amplification and much greater torque exerted by the torquers 28 and 30 during quick erection, it is immaterial whether or not the torquers 52 and 53 remain operative at this time or not.

If the gyros are not running or just starting up, the platform will, of course, be levelled quickly by the follow-up action of the torquers 28, 30, but if the gyros are running at substantial speed, the torquers will not move the platform initially but will cause one or both gyros to bring the arms 82 thereof against one of their fixed stops 43. As soon as a stop is struck, the gyroscopic resistance will be removed and the platform levelled. However, such action may be oscillatory and undamped and, therefore, in order to secure proper damping the outputs of the two pick-offs 54 and 56 on the gyro are preferably allowed to remain connected to the amplifiers 78 and 80 and to the gimbal torquers, as shown in Fig. 2, but the connections of the liquid level device to the mixer amplifiers at this time are such that their outputs are opposed by the outputs of the pick-offs 54 and 56 so as to damp the oscillation of the platform in a manner somewhat similar to Coulomb friction damping.

Even better damping may be secured by placing compression springs 44, 45 around the stops which are engaged by the arms 82 before the stop pins 43 are engaged (Fig. 3). Clearance, however, is provided between the ends of the compression springs and the end of each arm 82 so that precession of the gyro is unrestrained during normal operation of the gyros and the springs are only struck during the resetting operation. Preferably the centralizing springs are made sufficiently resilient so that the damping signals from the pick-offs 54 and 56 are proportional to the angular velocity of the platform, since the gyro after striking the springs will act as a rate gyro. As the gimbal torquers tend to accelerate the re-levelling of the platform, the gyro pick-off signals will increase as the angular velocity of the platform increases (that is, as the precession velocity of the gyro increases) giving a viscous type damping up until the fixed stops are struck. In the settling operation, after the first initial cycle the amplitude of movement of the platform will be reduced so that the fixed stops will usually not be struck and viscous damping alone obtained.

Initial setting on the meridian is accomplished in much the same manner by feeding the signal from the output of the synchro generator 63 (which is produced when the position of the platform in azimuth deviates from that of the flux valve in the earth's field) to amplifier 90" and the azimuth motor 32 instead of or in addition to the torquer 67 on the gyro. Likewise the output of pick-off 66 is kept in the motor circuit for damping purposes.

The switches 70, 72 and 74 are shown as jointly operated by a solenoid 82 which, when excited by closing quick setting button 76, pulls all switches into the lower position for quick levelling and synchronizing. The starting button 76 is then released but a timing mechanism 84 of known type holds the switches down for a predetermined period and then releases them when the switches are returned to their normal position by a spring 85.

It will thus be seen by our invention that we have provided a quick synchronizing device operated to level the platform and position it in azimuth very quickly and independently of whether or not the gyros are up to speed or what the tilt angle of the platform may be or the error of the system in azimuth. It should also be observed that very little additional mechanism is provided for this levelling and synchronizing operation, since applicants employ the same signal sources and torquers as employed during normal operation but interconnect them in a different manner.

Still another type of damping may be effected in a very simple manner by mounting the liquid levels well below the horizontal axes 10—10 and 14—14 as by mounting the levels as shown in Fig. 4. One of the levels 90 is on the bottom of the sphere 8' secured to ring 8 and the other 92 on a bail 94 secured to gimbal 12'. Liquid levels or other pendulous devices are sensitive to all acceleration forces about their axis of sensitivity and hence they are responsive to tangential acceleration due to the angular acceleration of the platform about said axis as it is being erected. This tangential acceleration tends to oppose the acceleration of gravity on the liquid levels mounted below the gimbal axes thereby giving an inertia damping effect. It is to be understood that any one or all three of the damping systems described may be used as desired.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A quick setting arrangement for universally mounted gyroscopic apparatus slaved to a reference device, a reference device for said apparatus adapted to produce a control signal, a gyro on said apparatus having a pick-off responsive to precession thereof, a torquer for applying a torque on said gyro about its precession axis, a torquer for applying a torque about an axis of the apparatus, said first torquer being normally controlled by said reference device signal and said second torquer by said pick-off on the gyro, and means for quickly bringing the apparatus into synchronized relationship with the reference device including means for temporarily amplifying the control signal from the reference device and applying it to the second torquer.

2. A quick synchronizing device for slaved gyroscopic apparatus as claimed in claim 1, in which said gyro pick-off remains in partial control of said second torquer during synchronization for damping purposes.

3. A stabilized platform including a gravitationally responsive device producing a control signal, a gyro having a pick-off responsive to precession thereof, a torquer for applying a torque on said gyro about its precession axis and a torquer for applying a levelling torque on the platform, said first torquer being normally controlled by said gravitational device signal, and said second torquer by said pick-off on the gyro, and means for quickly levelling the platform including a switch for temporarily causing the control signal produced by the gravitational device to control the platform torquer.

4. A quick levelling device for a stabilized platform as claimed in claim 3, in which said gyro pick-off remains in partial control of said platform torquer during quick levelling for damping purposes.

5. A platform mounted for freedom about a vertical axis and stabilized in azimuth including a compass device producing a control signal, a gyro on the platform having a pick-off responsive to precession thereof, a torquer for applying a torque to said gyro about its precession axis and an azimuth motor for applying a torque about said vertical axis, said torquer being normally controlled by said first control signal and said azimuth motor by said pick-off on the gyro, and means for quickly orienting the platform onto the meridian including a switch for temporarily applying the control signal to the azimuth motor.

6. A quick setting arrangement for levelling a universally mounted gyroscopically stabilized platform slaved to a gravitational reference device, including the reference device for said platform adapted to produce a control signal, a gyro mounted on said platform for precession about a vertical axis, a torquer for applying a torque on said gyro about said axis, a torquer for applying a torque about an axis about which said platform is pivoted, means for limiting the precession of said gyroscope on said platform, said first torquer being normally controlled by said gravitational device and said second torquer by the precession of said gyro about its precession axis, and means for quickly levelling the platform including means for temporarily causing said gravitational device to control said second torquer, but said second torquer also remaining under partial control of said gyro precession for damping purposes.

7. A quick synchronizing device for slaved gyroscopically stabilized references as claimed in claim 6, in which said precession limiting means includes springs opposing precession of said gyroscope beyond a predetermined free angle and fixed stops adapted to be struck upon further precession of the gyro against said springs.

8. A gyro magnetic compass comprising a stabilized platform mounted for orientation in azimuth, a magnetic compass such as a flux valve producing a control signal, a gyroscope mounted on said platform having its spin axis normally horizontal and mounted for precession about a second horizontal axis, a torquer for applying a torque about said precession axis, a second torquer for applying a torque about the axis of orientation, said first torquer being normally controlled by said compass signal and said second torquer normally controlled by precession of said gyroscope, and means for temporarily transferring the application of the compass signal from the gyro torquer to said second torquer.

9. A universally mounted stabilized platform including gravitationally responsive means for producing control signals upon tilt of said platform about its two axes as detected by said means, gyroscopes having pick-offs thereon responsive to precession thereof, a pair of torquers for applying torques on each gyro about its precession axis and a second pair of torquers for applying levelling torques on the platform about each axis, said first pair being normally controlled by said gravitational means and said second pair by said precession of said gyroscopes, and means for quickly levelling the platform including switches temporarily transferring the control of the platform torquers from the gyros to the gravitational means.

10. A universally mounted stabilized platform as claimed in claim 9, in which said gravitational means comprise a pair of liquid levels mounted below the pivotal axes of support of the platform, one responsive to tilts about one axis and the other to tilts about the other axis.

11. A stabilized platform as claimed in claim 3, in which said gravitational responsive device comprises a liquid level mounted below the pivotal axes of the platform, whereby damping action is secured during the levelling operation.

12. A quick setting arrangement for universally mounted gyroscopic apparatus, reference means for said apparatus adapted to produce control signals upon relative error between said means and apparatus about either of two axes, gyros on said apparatus, a pick-off on each producing second signals responsive to precession of each gyro about their precession axes, torquers for applying a torque on each gyro about said precession axes, torquers for applying torques on the apparatus about each of two axes, said first torquers being normally controlled by said error signals and said second torquers by said precession signals, and means for quickly eliminating the error between said apparatus and the reference means including means for temporarily applying said error signals to the second torquers.

13. A quick synchronizing device for gyroscopic apparatus as claimed in claim 12, in which said second signals remain in partial control of said second torquers during synchronization for damping purposes.

14. A quick setting arrangement for universally mounted gyroscopic apparatus, a reference device for said apparatus adapted to produce a control signal upon relative error between said device and apparatus about an axis, a gyro on said apparatus, a pick-off thereon producing a second signal responsive to precession thereof about a second axis, limiting stops about said second axis, a torquer for applying a torque on said gyro about said second axis, a torquer for applying a torque on the apparatus about said first axis, said first torquer being normally controlled by said first signal and said second torquer by said second signal, and means for quickly eliminating the error between said apparatus and the reference device including means for temporarily applying said first signal to the second torquer to thereby precess said gyro against one of said stops and directly move said platform about said first axis to eliminate said error.

15. A quick setting arrangement for universally mounted gyroscopic apparatus, a reference device for said apparatus adapted to produce a control signal upon relative error between said device and apparatus about an axis, a gyro on said apparatus, a pick-off thereon producing a second signal responsive to precession thereof about a second axis, centralizing springs and limiting stops about said second axis, a torquer for applying a torque on said gyro about said second axis, a torquer for applying a torque on the apparatus about said first axis, said first torquer being normally controlled by said first signal and said second torquer by said second signal, and means for quickly eliminating the error between said apparatus and the reference device including means for temporarily amplifying and applying said first signal to the second torquer to thereby precess said gyro against said centralizing springs and into contact with one of said stops, thereby directly moving said platform about said first axis until said error is eliminated.

16. A quick setting device for universally mounted gyroscopic apparatus in which said centrallizing springs are engaged by said gyro only during quick setting.

References Cited in the file of this patent

UNITED STATES PATENTS

| | | |
|---|---|---|
| 1,947,562 | Marmonier | Feb. 20, 1934 |
| 2,533,217 | Braddon | Dec. 12, 1950 |
| 2,542,975 | Adkins | Feb. 27, 1951 |
| 2,598,672 | Braddon et al. | June 3, 1952 |

UNITED STATES PATENT OFFICE
CERTIFICATE OF CORRECTION

Patent No. 2,771,779 November 27, 1956

Max A. Schaffer et al.

It is hereby certified that error appears in the printed specification of the above numbered patent requiring correction and that the said Letters Patent should read as corrected below.

Column 8, line 38, after "apparatus" insert -- as claimed in claim 15 --.

Signed and sealed this 22nd day of October 1957.

(SEAL)
Attest:

KARL H. AXLINE
Attesting Officer

ROBERT C. WATSON
Commissioner of Patents